United States Patent
Sando et al.

(10) Patent No.: US 8,657,715 B2
(45) Date of Patent: Feb. 25, 2014

(54) TORQUE DISTRIBUTOR

(75) Inventors: Katsuhiko Sando, Isehara (JP); Atsuhiro Mori, Fujisawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 219 days.

(21) Appl. No.: 13/145,034

(22) PCT Filed: Dec. 7, 2009

(86) PCT No.: PCT/JP2009/070459
§ 371 (c)(1), (2), (4) Date: Aug. 8, 2011

(87) PCT Pub. No.: WO2010/084667
PCT Pub. Date: Jul. 29, 2010

(65) Prior Publication Data
US 2012/0264557 A1    Oct. 18, 2012

(30) Foreign Application Priority Data
Jan. 22, 2009  (JP) ................................. 2009-011477

(51) Int. Cl.
*F16H 1/32*    (2006.01)
(52) U.S. Cl.
USPC ......................................................... 475/165
(58) Field of Classification Search
USPC ......... 475/162, 165, 168, 170; 74/390, 570.1, 74/571.1
See application file for complete search history.

(56) References Cited

U.S. PATENT DOCUMENTS

| | | | |
|---|---|---|---|
| 2,416,495 A * | 2/1947 | Piasse | ........................... 101/152 |
| 3,378,093 A | 4/1968 | Hill | |
| 3,475,993 A | 11/1969 | Hewko | |
| 4,014,224 A | 3/1977 | Pitts | |
| 4,483,055 A | 11/1984 | Sekimoto et al. | |
| 4,559,846 A | 12/1985 | Cochran et al. | |
| 4,656,891 A | 4/1987 | Durand | |

(Continued)

FOREIGN PATENT DOCUMENTS

| | | |
|---|---|---|
| DE | 1 167 553 | 4/1964 |
| EP | 1 808 617 A1 | 7/2007 |

(Continued)

OTHER PUBLICATIONS

USPTO, Final Office action, U.S. Appl. No. 12/810,255, Jun. 5, 2013, 21 pages.

(Continued)

*Primary Examiner* — Justin Holmes
(74) *Attorney, Agent, or Firm* — Foley & Lardner LLP (57) ABSTRACT

A torque distributor includes a friction-drive mechanism having a first roller rotatable together with a first rotary member, partly constituting a torque-transmission path to primary drive wheels, and a second roller rotatable together with a second rotary member, partly constituting a torque-transmission path to secondary drive wheels. Also provided is an eccentric-crank mechanism for revolving the second roller in a direction opposite to a rotation direction of power transmission of the second roller around an eccentric-shaft axis displaced from a second-roller rotation axis to produce a displacement of the second roller from a non-power-transmission position of non-frictional-contact with the first roller, thereby ensuring high-precision torque-distribution control with no reversal of a polarity of moment acting on a rotational-position-control system for eccentric cranks.

3 Claims, 5 Drawing Sheets

(56) References Cited

U.S. PATENT DOCUMENTS

| | | | |
|---|---|---|---|
| 4,782,721 A | 11/1988 | Dick | |
| 4,901,598 A | 2/1990 | Batchelor et al. | |
| 4,907,472 A | 3/1990 | Mura | |
| 5,054,335 A | 10/1991 | Andrews | |
| 5,167,589 A * | 12/1992 | Wawrzyniak et al. | 475/169 |
| 5,518,464 A | 5/1996 | Teraoka | |
| 6,199,653 B1 | 3/2001 | Matsufuji et al. | |
| 6,238,317 B1 | 5/2001 | Brown et al. | |
| 6,438,480 B2 | 8/2002 | Tanaka et al. | |
| 6,440,030 B1 | 8/2002 | Minegishi et al. | |
| 6,482,121 B2 | 11/2002 | Okoshi | |
| 6,551,211 B2 | 4/2003 | Kanazawa | |
| 6,719,658 B2 | 4/2004 | Haga et al. | |
| 6,849,025 B2 | 2/2005 | Chikaraishi et al. | |
| 6,955,623 B2 | 10/2005 | Pattok | |
| 7,387,588 B2 | 6/2008 | Bader | |
| 7,441,634 B2 | 10/2008 | Yamamoto | |
| 7,575,535 B2 | 8/2009 | Yamamoto | |
| 7,628,722 B2 | 12/2009 | Yoshimura | |
| 8,187,134 B2 * | 5/2012 | Mori et al. | 475/165 |
| 8,316,738 B2 | 11/2012 | Hellinger et al. | |
| 8,402,851 B2 * | 3/2013 | Mori et al. | 74/67 |
| 2002/0022546 A1 | 2/2002 | Okoshi | |
| 2002/0124686 A1 | 9/2002 | Ohtani et al. | |
| 2002/0147068 A1 | 10/2002 | Chikaraishi et al. | |
| 2004/0198549 A1 | 10/2004 | Wafzig | |
| 2005/0143211 A1 | 6/2005 | Yamamoto | |
| 2005/0266954 A1 | 12/2005 | Yoshimura | |
| 2008/0064553 A1 | 3/2008 | Newton | |
| 2010/0276246 A1 | 11/2010 | Mori et al. | |
| 2012/0089310 A1 * | 4/2012 | Sakagami et al. | 701/69 |

FOREIGN PATENT DOCUMENTS

| | | |
|---|---|---|
| JP | 02-033956 U | 3/1990 |
| JP | 6-74311 A | 3/1994 |
| JP | 2001-341539 A | 12/2001 |
| JP | 2002-31202 A | 1/2002 |
| JP | 2002-087091 A | 3/2002 |
| JP | 2002-087092 A | 3/2002 |
| JP | 2002-349653 A | 12/2002 |
| JP | 2002-349653 A | 12/2002 |
| JP | 2002-349654 A | 12/2002 |
| JP | 2003-028251 A | 1/2003 |
| JP | 2003-247617 A | 9/2003 |
| JP | 2004-306948 A | 11/2004 |
| JP | 2005-188701 A | 7/2005 |
| JP | 2005-188701 A | 7/2005 |
| JP | 2005-337442 A | 12/2005 |
| JP | 2006-132738 A | 5/2006 |
| WO | WO 2009/081876 A1 | 7/2009 |

OTHER PUBLICATIONS

USPTO, Adivsory Action, U.S. Appl. No. 12/810,255, Aug. 14, 2013, 2 pages.

USPTO, Non-Final Office Action, U.S. Appl. No. 12/810,255, Dec. 27, 2012, 18 pages.

* cited by examiner

FIG. 4A BDC
FIG. 4B
FIG. 4C
FIG. 4D TDC

CRANK ROTATION ANGLE θ

FIG. 5

FIG. 6A BDC
FIG. 6B
FIG. 6C
FIG. 6D TDC

FIG. 7

TORQUE DISTRIBUTOR

TECHNICAL FIELD

The present invention relates to an improved technology of a torque distributor suitable for a transfer of a four-wheel-drive vehicle.

BACKGROUND ART

As a device for distributing a driving force, a torque distributor as disclosed in Patent document 1 is generally known. The torque distributor disclosed in Patent document 1 is configured to distribute torque (driving force) depending on a radial pressing force between rollers.
Citation List
Patent Literature
Patent document 1: Japanese Patent Provisional Publication No. 2002-349653 (A)

SUMMARY OF INVENTION

Technical Problem

However, the previously-discussed prior-art torque distributor is designed such that the rollers are always loaded radially and held in contact with each other. Therefore, this type of torque distributor cannot be applied to a transfer of an automotive vehicle that requires switching operation between a two-wheel-drive mode and a four-wheel-drive mode.

Solution to Problem

It is, therefore, in view of the previously-described disadvantages of the prior art, an object of the invention to provide a torque distributor applicable to a transfer of an automotive vehicle that requires switching operation between a two-wheel-drive mode and a four-wheel-drive mode, by ON/OFF control for a capacity of torque transmitted between rollers.

In order to accomplish the aforementioned and other objects of the invention, as a prerequisite for a torque distributor, a torque distribution between primary drive wheels and secondary drive wheels is determined by distributing part of torque to be transmitted to the primary drive wheels to the secondary drive wheels, and the torque distributor includes a first roller rotatable together with a first rotary member, which constitutes a part of a torque-transmission path to the primary drive wheels, a second roller rotatable together with a second rotary member, which constitutes a part of a torque-transmission path to the secondary drive wheels, and a second-roller revolving mechanism for revolving the second roller in the direction opposite to the rotation direction of power transmission of the second roller around an eccentric-shaft axis which is offset from a rotation axis (a rotation center) of the second roller, so that the second roller is displaced from a non-power-transmission position, at which the second roller is spaced apart from the first roller, to a power-transmission position, at which the second roller is radially loaded and held in contact with the first roller.

BRIEF DESCRIPTION OF DRAWINGS

FIG. 4 is an explanatory view illustrating a situation of occurrences of a normal force acting in the direction of the normal line and a tangential force acting in the direction of the tangential line between the first and second rollers, and angular moments acting around the rotation axis of the crank and created by the normal force between the rollers and the tangential force between the rollers, when rotating the crank in the same direction as the power-transmission rotation direction of the second roller in the torque distributor shown in FIGS. 1-2.

FIG. 6 is an explanatory view illustrating a situation of occurrences of a normal force acting in the direction of the normal line and a tangential force acting in the direction of the tangential line between the first and second rollers, and angular moments acting around the rotation axis of the crank and created by the normal force between the rollers and the tangential force between the rollers, when rotating the crank in the direction opposite to the power-transmission rotation direction of the second roller in the torque distributor shown in FIGS. 1-2.

DESCRIPTION OF EMBODIMENTS

Therefore, according to the torque distributor of the present invention, when the second roller is displaced from the non-power-transmission position, at which the second roller is spaced apart from the first roller, to the power-transmission position, at which the second roller is radially loaded and held in contact with the first roller, by revolving the second roller in the direction opposite to the rotation direction of power transmission of the second roller around the eccentric-shaft axis, part of torque to be transmitted to the primary drive wheels is directed and delivered from the first roller through the second roller to the secondary drive wheels, and the magnitude of torque delivered to the secondary drive wheels is determined depending on a radially-loaded contact state (i.e., depending on a contact pressure between the rollers in contact), thus enabling both the primary drive wheels and the secondary drive wheels, that is, the four road wheels, to be driven.

Conversely when the second roller is displaced from the power-transmission position, at which the second roller is radially loaded and held in contact with the first roller, to the non-power-transmission position, at which the second roller is held out of contact with the first roller, by revolving the second roller in the reverse-rotational direction around the eccentric-shaft axis, part of torque to be transmitted to the primary drive wheels cannot be directed and delivered from the first roller through the second roller to the secondary drive wheels, thus enabling the two-wheel-drive mode at which only the primary drive wheels are driven.

Therefore, the torque distributor of the invention enables an ON/OFF control action for a capacity of torque transmitted between the first and second rollers, and whereby the torque distributor can be applied to a transfer of an automotive vehicle that requires switching operation between a two-wheel-drive mode and a four-wheel-drive mode.

Figure 1:
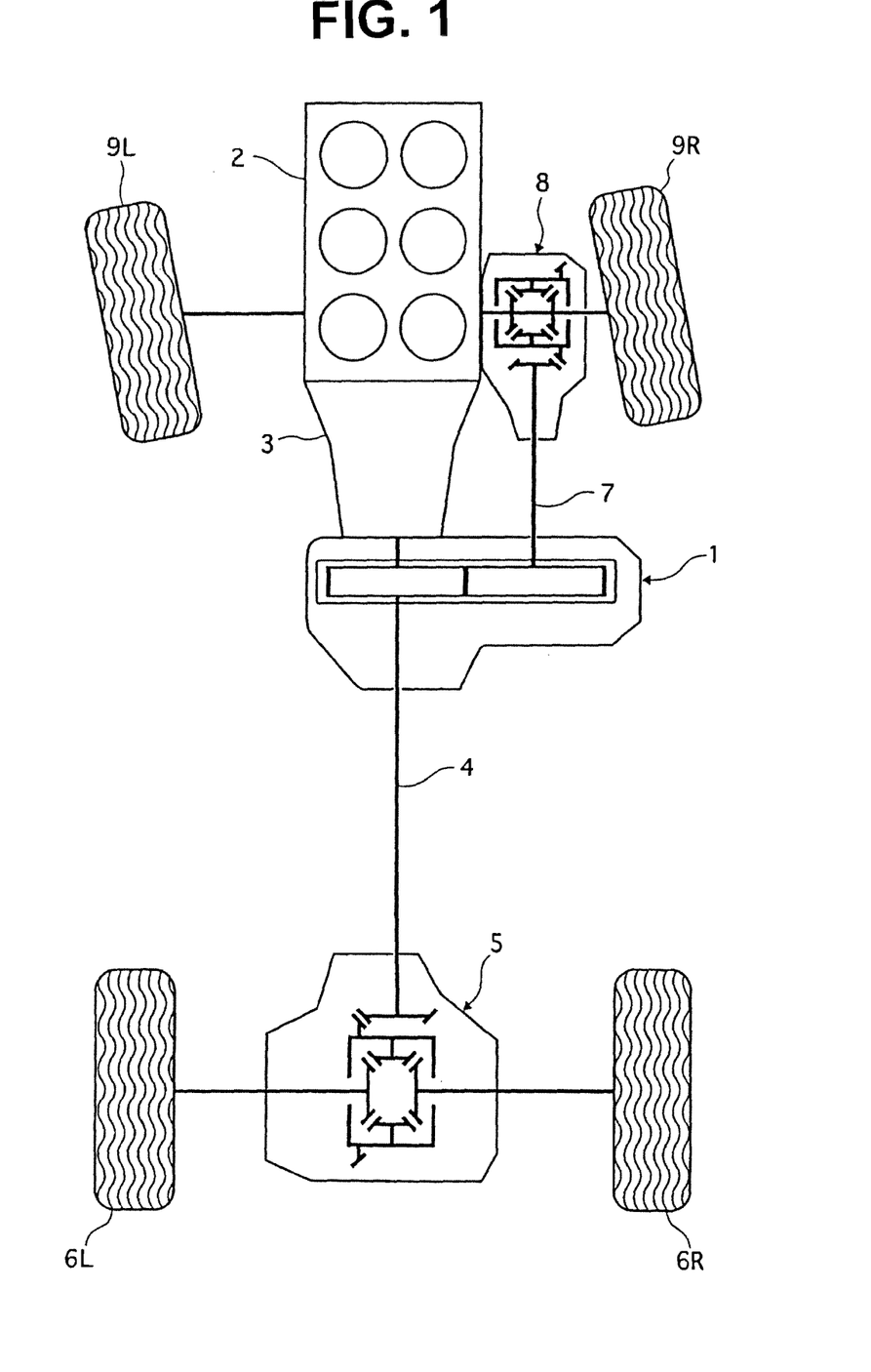
FIG. 1 is a schematic plan view illustrating a power train of a four-wheel-drive vehicle employing a torque distributor according to an embodiment of the present invention, when viewed from the top of the vehicle.

Detailed description will be made on a torque distributor according to the embodiment of the present invention in reference to the drawings.
<Construction>
FIG. 1 is the schematic plan view illustrating a power train of a four-wheel-drive vehicle employing a torque distributor 1 according to the embodiment of the present invention.

The four-wheel-drive vehicle of FIG. 1 is a four-wheeled automotive vehicle, which is configured to enable a rear-wheel-drive mode, at which rotation (torque) from an engine 2 is changed by a transmission 3 and then the changed rotation is transmitted through a rear propeller shaft 4 and a rear final drive unit 5 to rear-left and rear-right road wheels 6L and 6R, as a basic drive mode, and also to enable a four-wheel-drive mode, at which part of torque to be transmitted to rear-left and rear-right road wheels (primary drive wheels) 6L and 6R can be delivered and transmitted via the torque distributor 1 through a front propeller shaft 7 and a front final drive unit 8 to front-left and front-right road wheels (secondary drive wheels) 9L and 9R.

Torque distributor 1 is configured to determine a torque distribution between rear-left and rear-right road wheels (primary drive wheels) 6L-6R and front-left and front-right road wheels (secondary drive wheels) 9L-9R by distributing part of torque to be transmitted to rear-left and rear-right road wheels (primary drive wheels) 6L and 6R to front-left and front-right road wheels (secondary drive wheels) 9L and 9R. In the shown embodiment, torque distributor 1 is constructed as shown in FIG. 2.

Figure 2:
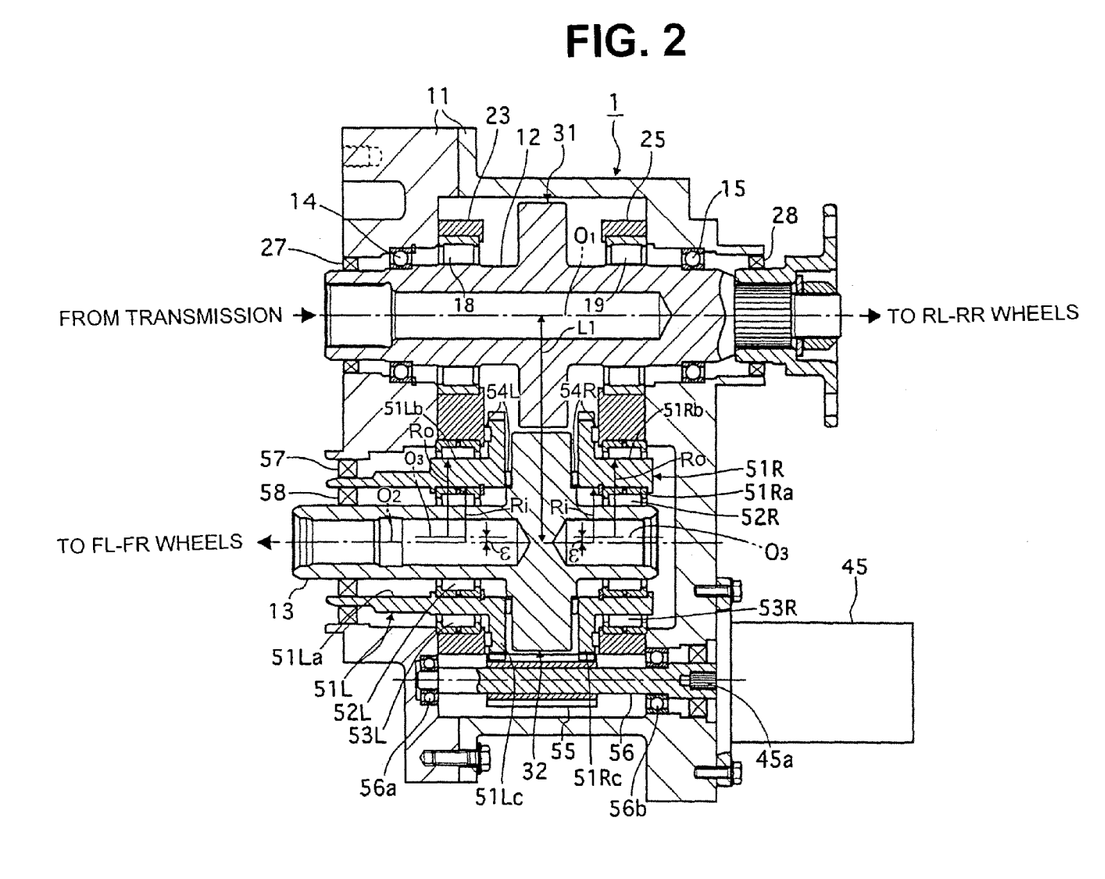
FIG. 2 is a side view of the torque distributor shown in FIG. 1 and longitudinally cross-sectioned.

In FIG. 2, an input shaft 12 and an output shaft 13 are installed in a housing, denoted by reference sign 11, such that the input and output shafts are arranged in parallel with each other. Both ends of input shaft 12 are rotatably supported by means of ball bearings 14 and 15, so as to permit rotation of the input shaft relative to housing 11. Furthermore, input shaft 12 is rotatably supported by means of roller bearings 18 and 19 installed in the housing 11, so as to permit rotation of the input shaft relative to housing 11. Roller bearings 18 and 19 are installed and held in respective bearing supports 23 and 25. These bearing supports 23 and 25 are installed and retained on respective opposed inside wall surfaces of housing 11 by fastening means (not shown), such as bolts or the like.

The two axial ends of input shaft 12 are sealed in a fluid-tight fashion by respective seal rings 27 and 28, and also protruded from the respective seal rings outside the housing 11. In the cross-sectional view, the left-hand end of input shaft 12 is connected to a transmission output shaft of transmission 3 (see FIG. 1), while the right-hand end of input shaft 12 is connected via the rear propeller shaft 4 (see FIG. 1) to the rear final drive unit 5.

A first roller 31 is integrally formed with the axial intermediate portion of input shaft 12 and arranged concentrically with the axis of input shaft 12. A second roller 32 is integrally formed with the axial intermediate portion of output shaft 13 and arranged concentrically with the axis of output shaft 13. First and second rollers 31-32 are arranged to be perpendicular to both the input shaft 12 and the output shaft 13, and also aligned so as to be positioned within a common plane perpendicular to the input and output shafts and common to the two rollers.

Output shaft 13 is rotatably supported on the housing 11 indirectly via components as discussed below. That is, two hollow eccentric cranks (control cranks) 51L and 51R (hereinafter simply referred to as "cranks") of an eccentric crank mechanism are laid out on both sides of second roller 32 integrally formed with the axial intermediate portion of output shaft 13 with clearance spaces. These cranks are mounted on both ends of output shaft 13. Bearings 52L and 52R are interleaved and fitted into the respective clearance spaces defined between the inner peripheral surfaces of central bores 51La and 51Ra (eccentric bores, each having a radius Ri) of cranks 51L and 51R and the outer peripheral surfaces of both ends of output shaft 13, for rotatably supporting the output shaft so as to permit free rotation of output shaft 13 about the geometric center $O_2$ common to the two central bores.

Figure 3:
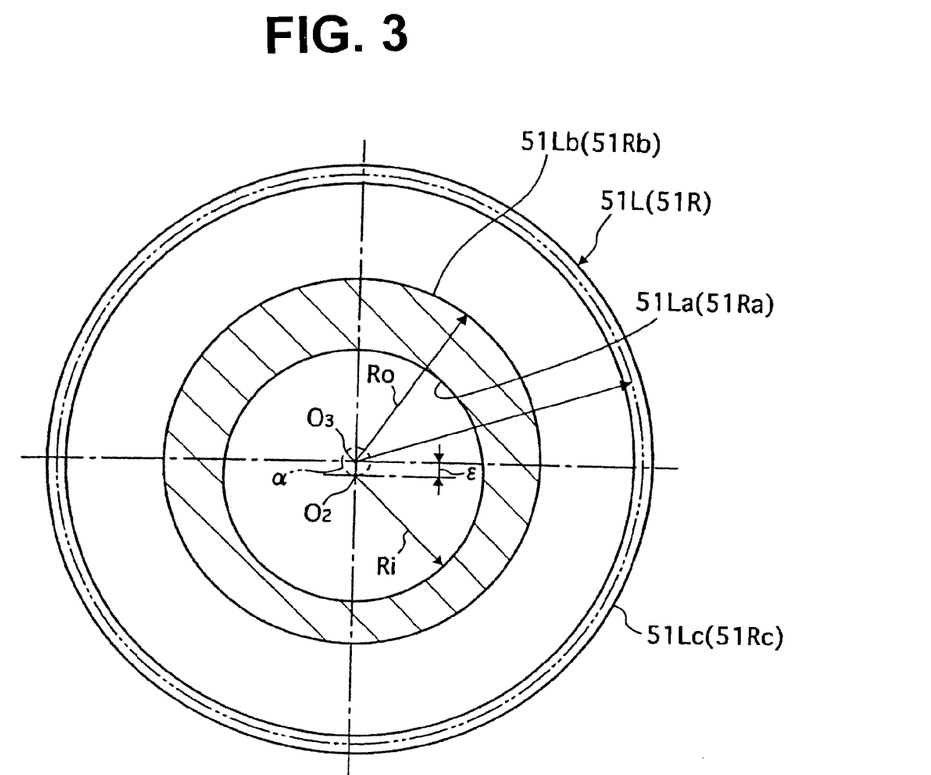
FIG. 3 is a front elevation view illustrating a crank laterally cross-sectioned and incorporated in the torque distributor of the embodiment shown in FIG. 1-2.

As clearly shown in FIG. 3, cranks 51L and 51R have outer peripheral portions 51Lb and 51Rb eccentric to respective central bores (eccentric bores) 51La and 51Ra, and thus eccentric to the geometric center $O_2$. Each of outer peripheral portions 51Lb and 51Rb has a radius Ro. The geometric center $O_3$ common to the two eccentric outer peripheral portions 51Lb and 51Rb is offset from the geometric center $O_2$ of central bores 51La and 51Ra, that is, the rotation axis of second roller 32 by an eccentricity ε between them. Eccentric outer peripheral portions 51Lb-51Rb of cranks 51L-51R are rotatably supported in respective bearing supports 23 and 25 via bearings 53L and 53R, and simultaneously cranks 51L-51R, together with second roller 32, are axially positioned by means of thrust bearings 54L and 54R.

Cranks 51L-51R are formed integral with respective ring gears 51Lc and 51Rc at the two adjacent ends of cranks 51L-51R, axially facing each other. These ring gears are arranged concentrically with eccentric outer peripheral portions 51Lb and 51Rb and have the same specification. A common crank-driving pinion 55 is kept in meshed-engagement with both the ring gears 51Lc-51Rc. When meshing, under a specified state where cranks 51L-51R are held at their angular positions that eccentric outer peripheral portions 51Lb-51Rb are circumferentially aligned with each other, the common crank-driving pinion 55 is brought into meshed-engagement with the two ring gears 51Lc-51Rc.

Crank-driving pinion 55 is fixedly connected to a pinion shaft 56. Both ends of pinion shaft 56 are rotatably supported on the housing 11 via bearings 56a and 56b. The right-hand end (viewing FIG. 2) of pinion shaft 56 is exposed outside the housing 11. A control motor for controlling or regulating a pressing force between the rollers (hereinafter referred to as "a roller contact-pressure control motor") 45 is installed on the housing 11. The serrated portion of an output shaft 45a of roller contact-pressure control motor 45 is fitted into the serrated bore formed in the exposed end face of pinion shaft 56, such that the pinion shaft has a driven connection with the output shaft of the control motor.

Hence, when rotational position control for cranks 51L-51R is performed via pinion 55 and ring gears 51Lc-51Rc by means of roller contact-pressure control motor 45, the rotation axis $O_2$ of second roller 32 as well as output shaft 13 is revolved and displaced along a locus circle a indicated by the broken line in FIG. 3. Owing to the revolving motion of the rotation axis $O_2$ around the geometric center $O_3$, a roller-to-roller distance L1 (see FIG. 2) between the first roller 31 and the second roller 32 can be varied, and thus a radial pressing force of the second roller 32 toward the first roller 31, that is, a contact pressure (a roller-and-roller transmitted torque capacity between the rollers) can be arbitrarily varied within a range from "0" to a maximum value. Therefore, roller contact-pressure control motor 45, pinion 55, and cranks 51L-51R, together with bearing supports 23 and 25, construct a second-roller revolving mechanism (second-roller revolving means) of the invention.

The left-hand ends (viewing FIG. 2) of crank 51L and output shaft 13 are protruded outside the housing 1. A seal ring 57 is interleaved between housing 11 and crank 51L, and a seal ring 58 is interleaved between crank 51L and output shaft 13, such that the protruded portions of crank 51L and output shaft 13 are sealed in a fluid-tight fashion by seal rings 57-58.

When interleaving seal rings 57-58, under a specified state where the center of inner-diameter and outer-diameter portions of the axial end of crank 51L, at which seal rings 57-58 are placed, is aligned eccentrically in the same eccentric direction as the supported portion of output shaft 13 rotatably supported, seal ring 57 is interleaved between the outer-diameter portion of the axial end of crank 51L and the housing 11, whereas seal ring 58 is interleaved between the inner-diameter portion of the axial end of crank 51L and the output shaft 13. With this seal-ring arrangement, it is possible to continuously produce a good sealing action at the protruded portion of output shaft 13 protruded outside the housing 11, regardless of a revolving displacement of the rotation axis $O_2$ about the geometric center $O_3$, arising from the revolving motion of the second roller 32, together with the output shaft 13.

<Torque-Distribution Control>

Details of driving-force distribution control (torque-distribution control) of the embodiment shown in FIGS. 1-3 are hereunder described.

On the one hand, that is, in the case of a zero contact pressure between the rollers, torque, inputted from transmission 3 to input shaft 12, is just transmitted from the input shaft 12 through rear propeller shaft 4 and rear final drive unit 5 (see FIG. 1) to rear-left and rear-right road wheels 6L-6R (primary drive wheels).

On the other hand, that is, in the case that the roller-to-roller distance L1 becomes less than the summed value of the radius of first roller 31 and the radius of second roller 32 with elastic deformation of the first and second rollers 31-32 within their contact area under Hertzian contact (i.e., under elastic contact) by virtue of rotational position control for cranks 51L-51R via pinion 55 and ring gears 51Lc-51Rc by roller contact-pressure control motor 45, rollers 31-32 cooperate with each other to produce a transmitted torque capacity, which depends on the magnitude of contact pressure between the rollers. Hence, torque distributor 1 of the embodiment can direct, depending on the transmitted torque capacity, part of torque to be transmitted to rear-left and rear-right road wheels 6L-6R (primary drive wheels) via the first and second rollers 31-32 to output shaft 13.

Thereafter, the torque, directed to the output shaft, is transmitted from the left-hand end (viewing FIG. 2) of output shaft 13 through front propeller shaft 7 and front final drive unit 8 (see FIG. 1) to front-left and front-right road wheels 9L-9R (secondary drive wheels).

In this manner, the vehicle can run in a four-wheel-drive mode at which all of rear-left and rear-right road wheels 6L-6R (primary drive wheels) and front-left and front-right road wheels 9L-9R (secondary drive wheels) can be driven.

During execution of roller-and-roller contact pressure control (roller-and-roller transmitted torque capacity control) performed by roller contact-pressure control motor 45, output shaft 13 and second roller 32 (that is, the rotation axis $O_2$ of the second roller as well as the output shaft) are revolved and displaced around the eccentric-shaft axis $O_3$ (i.e., the geometric center of the eccentric-crank outer peripheral portions 51Lb-51Rb. However, such revolving motion of output shaft 13 and second roller 32 (that is, such revolving motion of the rotation axis $O_2$ of the second roller as well as the output shaft) can be absorbed by means of a universal coupling installed between output shaft 13 and front propeller shaft 7. Thus, there is a less risk that torque transmission to front-left and front-right road wheels 9L-9R (secondary drive wheels) may be obstructed, even when an eccentric-shaft flexible coupling is not used.

<Regarding Direction of Revolving Motion of Second Roller During Torque-Distribution Control>

The previously-discussed torque-distribution control can be realized by revolving the second roller 32 (i.e., the rotation axis $O_2$) by means of cranks 51L-51R in the same direction as the rotation direction of power transmission of the second roller 32, or by revolving the second roller 32 (i.e., the rotation axis $O_2$) by means of cranks 51L-51R in the direction opposite to the rotation direction of power transmission of the second roller 32.

Hereinafter described is the former case that the second roller 32 (i.e., the rotation axis $O_2$) is revolved in the same direction as the rotation direction of power transmission of the second roller 32.

Figures 4A, 4B:
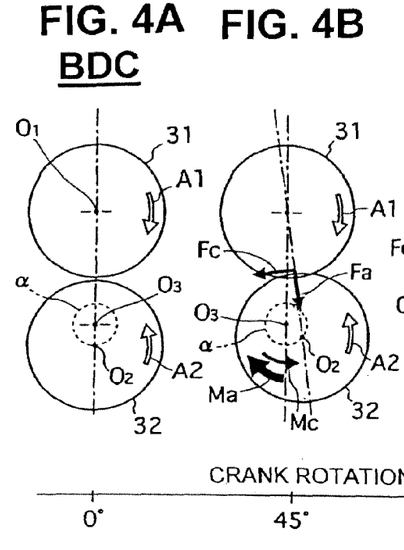
FIG. 4A is an explanatory view illustrating a state of crank rotation angle θ of 0°, i.e., the bottom dead center at which the rotation axis of the second roller is farthest away from the rotation axis of the first roller.
FIG. 4B is an explanatory view illustrating a state of crank rotation angle θ of 45° in which the rotation axis of the second roller slightly approaches the rotation axis of the first roller and the second roller is loaded radially toward the first roller by a normal force corresponding to the slight approach and held in contact with the first roller.
Figures 4C, 4D:
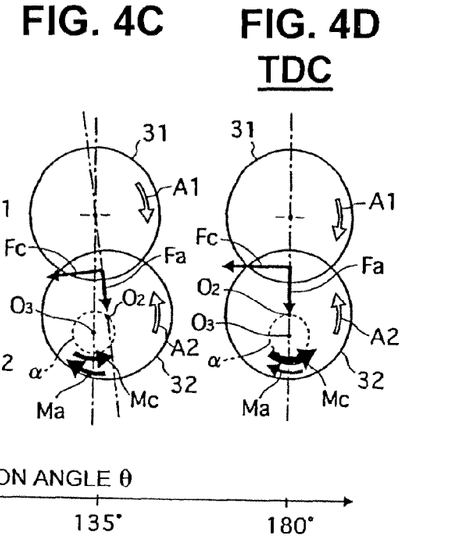
FIG. 4C is an explanatory view illustrating a state of crank rotation angle θ of 135° in which the rotation axis of the second roller further approaches the rotation axis of the first roller and the second roller is loaded radially toward the first roller by a reater normal force corresponding to the further approach and held in contact with the first roller.
FIG. 4D is an explanatory view illustrating a state of crank rotation angle θ of 180°, i.e., the top dead center at which the rotation axis of the second roller is closest to the rotation axis of the first roller.

Assuming that the rotation direction of power transmission of the second roller 32 is the direction denoted by the arrow "A2" in FIG. 4 and the direction denoted by the arrow "A1" is the rotation direction of power transmission of the first roller 31, the second roller 32 (i.e., the rotation axis $O_2$) can be revolved counter-clockwise from the bottom-dead-center (BDC) position (see FIG. 4A) at which crank rotation angle θ is 0', and further revolved via the intermediate angular positions shown in FIGS. 49-40, and still further revolved to the top-dead-center (TDC) position (see FIG. 49) at which crank rotation angle θ is 180°.

At the BDC position of FIG. 4A, at which crank rotation angle is 0°, the rotation axis $O_2$ of the second roller 32 is farthest away from the rotation axis $O_1$ of the first roller 31, and thus the second roller is held at a non-power-transmission position at which the second roller 32 is spaced away from the first roller 31.

When revolving the second roller 32 (i.e., the rotation axis $O_2$) from the BDC position in the same direction (i.e., the counter-clockwise direction of the drawings) as the rotation direction "A2" of power transmission of the second roller 32, the second roller 32 comes into contact with the first roller 31 slightly before reaching the intermediate angular position of FIG. 49 so as to establish a power-transmission starting position.

According to a further development of revolving motion of the second roller 32 (i.e., the rotation axis $O_2$) in the counter-clockwise direction via the intermediate angular positions of FIGS. 4B-4C to the TDC position of FIG. 4D, the radial pressing force (the contact pressure) between the first roller 31 and the second roller 32, that is, the normal force Fa, gradually increases, and also the tangential force Fc gradually increases. Thus, the power-transmission capacity for torque transmitted between the rollers becomes increased.

The normal force Fa creates an angular moment Ma acting in the clockwise direction of FIG. 4 (in particular, see FIGS. 4B-4C) around the eccentric-shaft axis $O_3$. This is because the rotation axis $O_2$ of the second roller 32 is located at the right-hand side of the eccentric-shaft axis $O_3$ in FIG. 4 (in particular, see FIGS. 4B-4C). The tangential force Fc creates an angular moment Mc acting in the counter-clockwise direction of FIG. 4 (in particular, see FIGS. 4B-4D) around the eccentric-shaft axis $O_3$. This is because the point of action (application) of the tangential force is located above the eccentric-shaft axis $O_3$ in FIG. 4 (in particular, see FIGS. 4B-4D). These angular moments Ma and Mc act in the opposite directions mutually.

By the way, as can be appreciated from the locus α of revolving motion of the second-roller rotation axis $O_2$, the arm length of angular moment Ma, created by normal force Fa, tends to vary like a quadratic curve. Thus, the magnitude of angular moment Ma tends to vary in the same manner (i.e., like a quadratic curve) as the characteristic curve of FIG. 5.

On the other hand, the arm length of angular moment Mc, created by tangential force Fc, tends to be held approximately constant, since the respective tangential forces Fc have almost the same level concerning the point of tangential-force application. However, as seen from variations in vector lengths of the respective tangential forces Fc, the magnitude of tangential force Fc tends to vary. Thus, the magnitude of angular moment Mc also varies in the same tendencies as the tangential-force-Fc-variation characteristic shown in FIG. 5.

The total angular moment M acting around the eccentric-shaft axis $O_3$ during the previously-discussed torque-distribution control, is the summed value (Ma+Mc) of the angular moment Ma created by normal force Fa and the angular moment Mc created by tangential force Fc. The total angular moment M has a crank-rotation-angle θ versus angular-moment-M-variation tendency as shown in FIG. 5.

Therefore, as can be appreciated from the widths of the arrows corresponding to the two different angular moments shown in FIG. 4, the relation of management (concerning torque-distribution control) between the angular moment Ma created by normal force Fa and the angular moment Mc created by tangential force Fc tends to shift from the angular moment Ma created by normal force Fa to the angular moment Mc created by tangential force Fc, as the crank rotation angle θ increases. In other words, the relation of management (concerning torque-distribution control) between the two reaction forces, that is, the relation of management (control) between the normal force Fa and the tangential force Fc is reversed.

Figure 5:
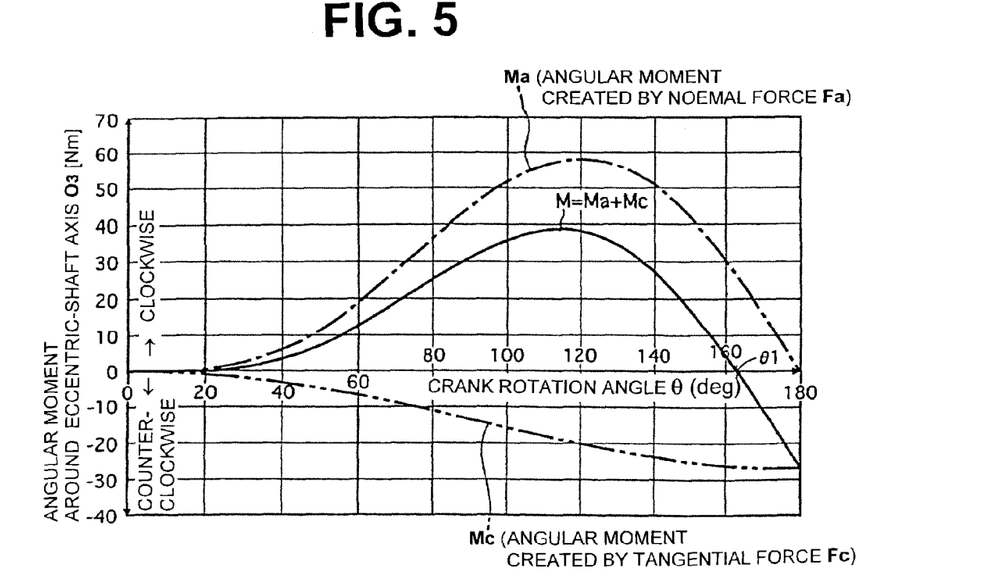
FIG. 5 is a characteristic diagram illustrating the relationship between the crank rotation angle θ of the torque distributor shown in FIGS. 1-2, and the total angular moment M (=Ma+Mc) acting around the rotation axis of the crank and created by the normal force Fa between the rollers and the tangential force Fe between the rollers, and related to FIGS. 4A-4D.

By the way, the angular moments Ma and Mc act in the opposite directions mutually, and hence the direction (i.e., the polarity) of the total angular moment M (=Ma+Mc), which is equal to the summed value of these angular moments Ma and Mc, is reversed just after a specified crank rotation angle θ1 of crank rotation angles θ in FIG. 5.

This means that the direction of load on motor 45, which is provided to perform rotational position control for cranks 51L-51R, is reversed in the middle of torque-distribution control achieved based on control action for crank rotation angle θ, and whereby it is impossible to avoid the accuracy of torque-distribution control from being deteriorated.

Additionally, when the direction (the polarity) of the total angular moment M is reversed, there is another problem of hammering noise occurring owing to backlash at the meshed-engagement portions between the common crank-driving pinion 55 and ring gears 51Lc-51Rc constructing the rotational position control system for cranks 51L-51R.

In contrast to the above, hereinafter is the latter case that the second roller 32 (i.e., the rotation axis $O_z$) is revolved in the direction opposite to the rotation direction of power transmission of the second roller 32.

Figures 6A, 6B, 6C, 6D:
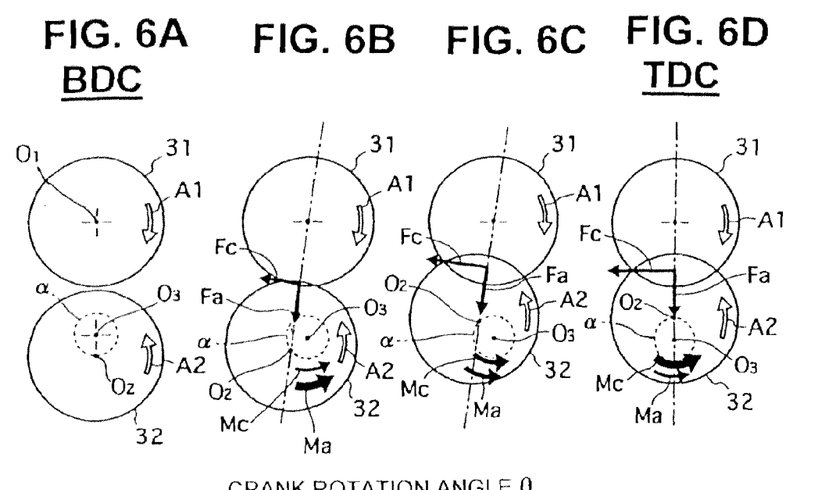
FIG. 6A is an explanatory view illustrating a state of crank rotation angle θ of 0°, i.e., the bottom dead center at which the rotation axis of the second roller is farthest away from the rotation axis of the first roller.
FIG. 6B is an explanatory view illustrating a state of crank rotation angle θ of 45° in which the rotation axis of the second roller slightly approaches the rotation axis of the first roller and the second roller is loaded radially toward the first roller by a normal force corresponding to the slight approach and held in contact with the first roller.
FIG. 6C is an explanatory view illustrating a state of crank rotation angle θ of 135° in which the rotation axis of the second roller further approaches the rotation axis of the first roller and the second roller is loaded radially toward the first roller by a greater normal force corresponding to the further approach and held in contact with the first roller.
FIG. 6D is an explanatory view illustrating a state of crank rotation angle θ of 180°, i.e., the top dead center at which the rotation axis of the second roller is closest to the rotation axis of the first roller.

Assuming that, in the same manner as FIG. 4, the rotation direction of power transmission of the second roller 32 is the direction denoted by the arrow "A2" in FIG. 6 and the direction denoted by the arrow "A1" is the rotation direction of power transmission of the first roller 31, the second roller 32 (i.e., the rotation axis $O_2$) can be revolved clockwise from the BDC position (see FIG. 6A) at which crank rotation angle θ is 0°, and further revolved via the intermediate angular positions shown in FIGS. 6B-6C, and still further revolved to the TDC position (see FIG. 6D) at which crank rotation angle θ is 180°.

At the BDC position of FIG. 6A, at which crank rotation angle is 0°, the rotation axis $O_2$ of the second roller 32 is farthest away from the rotation axis $O_1$ of the first roller 31, and thus the second roller is held at a non-power-transmission position at which the second roller 32 is spaced away from the first roller 31.

When revolving the second roller 32 (i.e., the rotation axis $O_z$) from the BDC position in the direction (i.e., the clockwise direction of the drawings) opposite to the rotation direction "A2" of power transmission of the second roller 32, the second roller 32 comes into contact with the first roller 31 slightly before reaching the intermediate angular position of FIG. 6B so as to establish a power-transmission starting position.

According to a further development of revolving motion of the second roller 32 (i.e., the rotation axis $O_2$) in the clockwise direction via the intermediate angular positions of FIGS. 6B-6C to the TDC position of FIG. 6D, the radial pressing force (the contact pressure) between the first roller 31 and the second roller 32, that is, the normal force Fa, gradually increases, and also the tangential force Fc gradually increases. Thus, the power-transmission capacity for torque transmitted between the rollers becomes increased.

The normal force Fa creates an angular moment Ma acting in the counter-clockwise direction of FIG. 6 (in particular, see FIGS. 6B-6C) around the eccentric-shaft axis $O_3$. This is because the rotation axis $O_2$ of the second roller 32 is located at the left-hand side of the eccentric-shaft axis $O_3$ in FIG. 6 (in particular, see FIGS. 6B-6C). The tangential force Fc creates an angular moment Mc acting in the counter-clockwise direction of FIG. 6 (in particular, see FIGS. 6B-6D) around the eccentric-shaft axis $O_3$. This is because the point of action (application) of the tangential force is located above the eccentric-shaft axis $O_3$ in FIG. 6 (in particular, see FIGS. 6B-6D). These angular moments Ma and Mc act in the same counter-clockwise direction of FIG. 6.

By the way, as can be appreciated from the locus α of revolving motion of the second-roller rotation axis $O_2$, the arm length of angular moment Ma, created by normal force Fa, tends to vary like a quadratic curve. Thus, the magnitude of angular moment Ma tends to vary in the same manner (i.e., like a quadratic curve) as the characteristic curve shown in FIG. 7.

On the other hand, the arm length of angular moment Mc, created by tangential force Fc, tends to be held approximately constant, since the respective tangential forces Fc have almost the same level concerning the point of tangential-force application. However, as seen from variations in vector lengths of the respective tangential forces Fc, the magnitude of tangential force Fc tends to vary. Thus, the magnitude of angular moment Mc also varies in the same tendencies as the tangential-force-Fc-variation characteristic shown in FIG. 7.

The total angular moment M acting around the eccentric-shaft axis $O_3$ during the previously-discussed torque-distribution control, is the summed value (Ma+Mc) of the angular moment Ma created by normal force Fa and the angular moment Mc created by tangential force Fc. The total angular moment M has a crank-rotation-angle θ versus angular-moment-M-variation tendency as indicated in FIG. 7.

Therefore, as can be appreciated from the widths of the arrows corresponding to the two different angular moments shown in FIG. 6, the relation of management (concerning torque-distribution control) between the angular moment Ma created by normal force Fa and the angular moment Mc created by tangential force Fc tends to shift from the angular moment Ma created by normal force Fa to the angular moment Mc created by tangential force Fc, as the crank rotation angle θ increases. In other words, the relation of management (concerning torque-distribution control) between the two reaction forces, that is, the relation of management (control) between the normal force Fa and the tangential force Fc is reversed.

Figure 7:
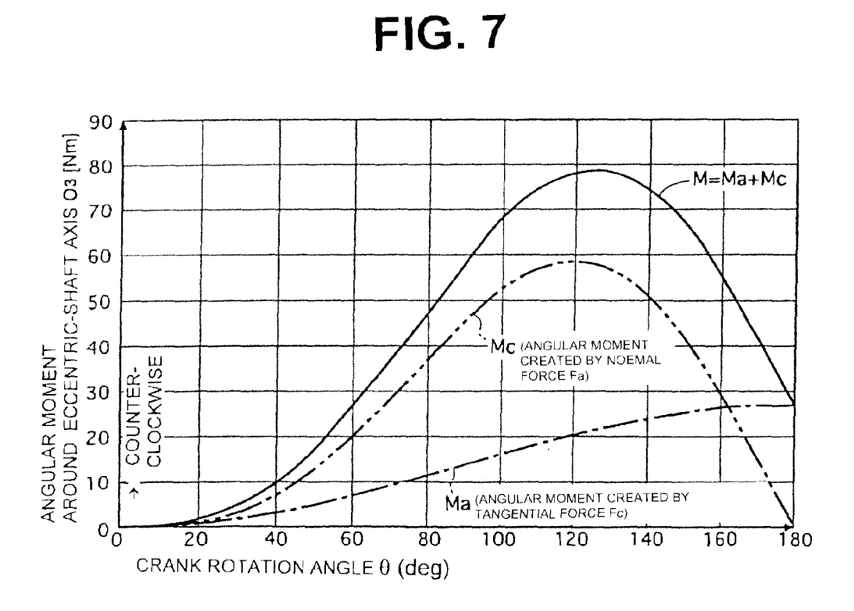
FIG. 7 is a characteristic diagram illustrating the relationship between the crank rotation angle θ of the torque distributor shown in FIGS. 1-2, and the total angular moment M (=Ma+Mc) acting around the rotation axis of the crank and created by the normal force Fa between the rollers and the tangential force Fc between the rollers, and related to FIGS. 6A-6D.

By the way, the angular moments Ma and Mc act in the same direction, and hence the direction (i.e., the polarity) of the total angular moment M (=Ma+Mc), which is equal to the summed value of these angular moments Ma and Mc, is kept unchanged within the entire crank-rotation-angle-θ range of FIG. 7 from 0° to 180°, and thus the direction of the total angular moment M is also kept unchanged.

This means that the direction of load on motor 45, which is provided to perform rotational position control for cranks 51L-51R, cannot be reversed in the middle of torque-distribution control achieved based on control action for crank rotation angle θ, and whereby it is possible to avoid a deterioration in the accuracy of torque-distribution control, which deterioration may occur owing to the reversal.

Additionally, the direction (the polarity) of the total angular moment M cannot be reversed and hence there is no reversal of the direction of torque-transmission at the meshed-engagement portions between the common crank-driving pinion 55 and ring gears 51Lc-51Rc constructing the rotational position control system for cranks 51L-51R. Thus, it is possible to avoid the problem of hammering noise occurring owing to backlash of the meshing gear.

On the basis of the above-mentioned fact-recognition, in executing torque-distribution control based on rotational position control for cranks 51L-51R (position control for revolving motion of second-roller rotation axis $O_2$), performed by motor 45, during roller-and-roller radial-pressing-force increase control (i.e., during roller-and-roller contact pressure increase control), the torque distributor of the embodiment is configured to revolve the second roller 32 (i.e., the rotation axis $O_2$) in the direction opposite to the rotation direction "A2" of power transmission of the second roller 32 via cranks 51L-51R by means of motor 45.

According to the torque distributor of the embodiment, when the second roller 32 is displaced from the non-power-transmission position of FIG. 6A, at which the second roller is spaced apart from the first roller 31, to the power-transmission positions of FIGS. 6B, 6C, and 6D, at which the second roller is radially loaded and held in contact with the first roller 31, by revolving the second roller 32 in the direction opposite to the rotation direction "A2" of power transmission of the second roller 32 around the eccentric-shaft axis $O_3$, part of torque to be transmitted to rear road wheels (primary drive wheels) 6L-6R can be directed or delivered from the first roller 31 via the second roller 32 to front road wheels (secondary drive wheels) 9L-9R depending on the radially-loaded contact state (i.e., depending on the contact pressure between the rollers), thereby enabling the four-wheel-drive mode at which all of primary drive wheels and secondary drive wheels can be driven.

Conversely when the second roller 32 is displaced from the power-transmission positions of FIGS. 6B, 6C, and 6D, at which the second roller is radially loaded and held in contact with the first roller 31, to the non-power-transmission position of FIG. 6A, at which the second roller is held out of contact with the first roller 31, by revolving the second roller 32 in the reverse-rotational direction around the eccentric-shaft axis $O_3$, part of torque to be transmitted to rear road wheels (primary drive wheels) 6L-6R cannot be directed and delivered from the first roller 31 via the second roller 32 to front road wheels (secondary drive wheels) 9L-9R, thus enabling the two-wheel-drive mode at which only the rear road wheels (primary drive wheels) 6L-6R are driven.

Therefore, the torque distributor of the embodiment enables an ON/OFF control action for a capacity of torque transmitted between the first and second rollers 31-32, and whereby the torque distributor can be applied to a transfer of an automotive vehicle that requires switching operation between a two-wheel-drive mode and a four-wheel-drive mode, without any problem.

Furthermore, in the shown embodiment, in executing torque-distribution control based on rotational position control for cranks 51L-51R (position control for revolving motion of second-roller rotation axis $O_2$), performed by motor 45, during roller-and-roller radial-pressing-force increase control (i.e., during roller-and-roller contact pressure increase control), the torque distributor is configured to revolve the second roller 32 (i.e., the rotation axis $O_2$) in the direction opposite to the rotation direction "A2" of power transmission of the second roller 32 via cranks 51L-51R by means of motor 45, and hence the torque distributor of the embodiment can provide the following operation and effects.

That is to say, when the direction of revolving motion of the second roller 32 (rotation axis $O_2$) during roller-and-roller radial-pressing-force increase control is opposite to the rotation direction "A2" of power transmission of the second roller 32, an angular moment Ma created by a roller-and-roller radial pressing force (a normal force) Fa and an angular moment Mc created by a tangential force Fc act in the same direction. Hence, even when the relation of management (concerning torque-distribution control) between the two different moments Ma-Mc is changed as discussed previously in reference to FIG. 6, the direction (i.e., the polarity) of the total angular moment M (=Ma+Mc), which is equal to the summed value of these angular moments Ma and Mc, is kept unchanged within the entire crank-rotation-angle-θ range of FIG. 7 from 0° to 180°, and thus the direction of the total angular moment M is also kept unchanged.

Therefore, the direction of load on motor 45, which is provided to perform rotational position control for cranks 51L-51R, cannot be reversed in the middle of torque-distribution control achieved based on control action for crank rotation angle θ, and whereby it is possible to avoid a deterioration in the accuracy of torque-distribution control, which deterioration may occur owing to the reversal, thus enabling execution of high-precision torque-distribution control.

Additionally, the direction (the polarity) of the total angular moment M cannot be reversed and hence there is no reversal of the direction of torque-transmission at the meshed-engagement portions between the common crank-driving pinion 55 and ring gears 51Lc-51Rc constructing the rotational position control system for cranks 51L-51R. Thus, it is possible to avoid the problem of hammering noise occurring owing to backlash of the meshing gear.

In the shown embodiment, as previously discussed in reference to FIG. 2, the torque distributor is configured such that the second roller 32 is rotatably supported to be revolved around the eccentric-shaft axis $O_3$ by eccentric bores 51La-51Ra of cranks 51L-51R, and the second roller 32 is revolved and displaced from the non-power-transmission position, at which the second roller 32 is held out of contact with the first roller 31, to the power-transmission position, at which the second roller is radially loaded and held in contact with the first roller 31, by rotating cranks 51L-51R in the direction opposite to the rotation direction "A2" of power transmission of the second roller 32. In lieu of the hollow eccentric crank mechanism having the eccentric bores, another type of eccentric crank mechanism having a solid eccentric shaft may be used. In this case, the torque distributor may be configured such that the second roller 32 is rotatably supported on the solid eccentric shaft of the crank to be revolved around the eccentric-shaft axis $O_3$ (the geometric center of the solid eccentric shaft) and the second roller 32 is revolved and displaced from the non-power-transmission position, at which the second roller 32 is held out of contact with the first roller 31, to the power-transmission position, at which the second roller is radially loaded and held in contact with the first roller 31, by rotating the solid eccentric crank in the direction opposite to the rotation direction "A2" of power transmission of the second roller 32. This type of eccentric crank mechanism (i.e., the solid eccentric crank mechanism) can provide the same operation and effects as the hollow eccentric crank mechanism.

In the case of the torque-distribution system as clearly shown in FIGS. 6A-6D, that is, in the case of the system that the angle range of revolution of the second roller 32 (the rotation axis $O_2$) around the eccentric-shaft axis $O_3$ is set to 180°, in switching from the two-wheel-drive mode to the four-wheel-drive mode, it is possible to control the direction of revolution of the second roller (the rotation axis $O_2$) around the eccentric-shaft axis $O_3$ in the direction opposite to the direction of rotation of the second roller in both a forward-running state and a reverse-running state.

In contrast to the above, in the case of the system that the angle range of revolution of the second roller around the eccentric-shaft axis is set to be less than 180° and the direction of revolution of the second roller is limited to a single direction, it is impossible to control the direction of revolution of the second roller around the eccentric-shaft axis in the direction opposite to the direction of rotation of the second roller in both a forward-running state and a reverse-running state. Hence, such a system has to be configured such that the direction of revolution of the second roller around the eccentric-shaft axis can be controlled in the direction opposite to the direction of rotation of the second roller only in a forward-running state having a higher operating frequency rather than a reverse-running state.

What is claimed is:

1. A torque distributor for a four-wheel-drive vehicle configured to determine a torque distribution between primary drive wheels of the four-wheel-drive vehicle and secondary drive wheels of the four-wheel-drive vehicle by distributing part of a torque to be transmitted to the primary drive wheels to the secondary drive wheels, comprising:
    a first roller rotatable together with a first rotary member, which constitutes a part of a torque-transmission path to the primary drive wheels;
    a second roller rotatable together with a second rotary member, which constitutes a part of a torque-transmission path to the secondary drive wheels; and
    a second-roller revolving mechanism configured to revolve the second roller in a direction opposite to a rotation direction of power transmission of the second roller around an eccentric-shaft axis which is offset from a rotation axis of the second roller to produce a displacement of the second roller from a non-power-transmission position, at which the second roller is spaced apart from the first roller, to a power-transmission position, at which the second roller is radially loaded and held in contact with the first roller.

2. The torque distributor as claimed in claim 1, wherein the second-roller revolving mechanism comprises an eccentric crank mechanism configured to rotably support the second roller around the eccentric-shaft axis; and
    wherein the eccentric crank mechanism is configured to revolve the second roller from the non-power-transmission position to the power-transmission position by rotating a crank of the eccentric crank mechanism in the direction opposite to the rotation direction of power transmission of the second roller.

3. The torque distributor as claimed in claim 2, wherein the crank of the eccentric crank mechanism comprises a hollow crank having an eccentric-shaft bore formed therein;
    wherein the second roller is rotatably supported to be revolved around the eccentric-shaft axis by the eccentric-shaft bore of the hollow crank; and
    wherein the second roller is revolved from the non-power-transmission position to the power-transmission position by revolving the hollow crank in the direction opposite to the rotation direction of power transmission of the second roller.

* * * * *